United States Patent
Karpaty et al.

(10) Patent No.: US 11,939,927 B2
(45) Date of Patent: Mar. 26, 2024

(54) INTERNAL COMBUSTION ENGINE WITH OXYGEN CONCENTRATING EQUIPMENT, METHOD, PROGRAM PRODUCT AND COMPUTER-READABLE MEDIUM FOR OPERATING INTERNAL COMBUSTION ENGINE WITH OXYGEN CONCENTRATING EQUIPMENT

(71) Applicants: Stephen Karpaty, Streetsboro, OH (US); Istvan Karpaty, Budapest (HU)

(72) Inventors: Stephen Karpaty, Streetsboro, OH (US); Istvan Karpaty, Budapest (HU)

(*) Notice: Subject to any disclaimer, the term of this patent is extended or adjusted under 35 U.S.C. 154(b) by 65 days.

(21) Appl. No.: 17/750,324

(22) Filed: Jun. 26, 2022

(65) Prior Publication Data
US 2023/0035188 A1 Feb. 2, 2023

(30) Foreign Application Priority Data

May 23, 2021 (HU) .................................. P2100202

(51) Int. Cl.
  *F02D 21/02* (2006.01)
  *F02D 41/14* (2006.01)
  *F02M 25/10* (2006.01)

(52) U.S. Cl.
  CPC .......... *F02D 21/02* (2013.01); *F02D 41/1454* (2013.01); *F02D 41/1475* (2013.01); *F02M 25/10* (2013.01); *F02D 2200/101* (2013.01)

(58) Field of Classification Search
  CPC ..... F02M 25/10; F02D 13/0276; F02D 21/02; F02D 2200/101; F02D 41/0025;
  (Continued)

(56) References Cited

U.S. PATENT DOCUMENTS

| | | | |
|---|---|---|---|
| 4,240,381 A | | 12/1980 | Lowther |
| 5,051,113 A | * | 9/1991 | Nemser ................. B01D 53/22 123/26 |

(Continued)

FOREIGN PATENT DOCUMENTS

| | | |
|---|---|---|
| CN | 1309237 A | 8/2001 |
| FR | 2926597 A1 | 7/2009 |
| WO | 2011007121 A2 | 1/2011 |

OTHER PUBLICATIONS

Chong et al.: Recent Progress of Oxygen/Nitrogen Separation Using Membrane Technology, Journal of Engineering Science and Technology, Jul. 2016, vol. 11(7), pp. 1016-1030, Taylor's University, Malaysia.

(Continued)

*Primary Examiner* — Carl C Staubach

(57) ABSTRACT

The solution of the invention is an internal combustion engine with oxygen concentrating equipment (80) wherein the air taken in the cylinder space (15) during the intake stroke and pushed out by the piston (5) during the charging stroke charges one or more cells (41A-41Z, 51A-51Z) of the oxygen concentrating equipment (80) and after separating most of the nitrogen in the cells (41A-41Z, 51A-51Z), the oxygen rich air is injected into the cylinder space (15) through a compressor (33) at the beginning of the expansion stroke by an injector (11). The fuel is also introduced into the cylinder space (15) at the beginning of the expansion stroke by a fuel injector (19). The ignition may be spark ignition, self-ignition or their combination.

20 Claims, 11 Drawing Sheets

(58) Field of Classification Search
CPC ............ F02D 41/1454; F02D 41/1475; F02D 41/3035; F02D 41/3041; F02B 51/00; B01D 2253/108; B01D 2256/12; B01D 2257/102; B01D 2258/01; B01D 2259/4566; B01D 53/04; B01D 53/22
See application file for complete search history.

(56) References Cited

U.S. PATENT DOCUMENTS

| | | | | |
|---|---|---|---|---|
| 5,636,619 | A * | 6/1997 | Poola | B01J 19/088 |
| | | | | 123/585 |
| 5,862,790 | A * | 1/1999 | Dai | F02B 21/00 |
| | | | | 123/316 |
| 6,055,808 | A * | 5/2000 | Poola | F02B 33/44 |
| | | | | 123/26 |
| 8,607,769 | B2 * | 12/2013 | Gaur | F02M 23/00 |
| | | | | 123/585 |
| 9,149,757 | B2 | 10/2015 | Oddo | |
| 10,655,549 | B2 * | 5/2020 | Ruiz | F02D 11/107 |
| 2003/0015185 | A1 * | 1/2003 | Dutart | F02B 37/00 |
| | | | | 123/585 |
| 2004/0007217 | A1 * | 1/2004 | Poola | F02M 67/02 |
| | | | | 123/533 |
| 2005/0142048 | A1 * | 6/2005 | Parsa | B01D 53/323 |
| | | | | 422/186.04 |
| 2009/0166358 | A1 * | 7/2009 | Bose | B01D 53/24 |
| | | | | 220/88.3 |
| 2011/0023820 | A1 * | 2/2011 | Donitz | F01L 13/06 |
| | | | | 123/316 |
| 2012/0192834 | A1 * | 8/2012 | Tonery | F02M 26/25 |
| | | | | 123/434 |
| 2019/0211782 | A1 * | 7/2019 | Van Tran | F02B 29/0406 |

OTHER PUBLICATIONS

Notice of Allowance ("Határozat", Decision; "Tárgy: Szabadalom megadása", Subject: Grant of patent) of parent application.
International Search Report (ISA/210) of PCT/HU2021/050074 international patent application.
Written Opinion of the International Searching Authority (ISA/237) of PCT/HU2021/050074 international patent application.

* cited by examiner

INTERNAL COMBUSTION ENGINE WITH OXYGEN CONCENTRATING EQUIPMENT, METHOD, PROGRAM PRODUCT AND COMPUTER-READABLE MEDIUM FOR OPERATING INTERNAL COMBUSTION ENGINE WITH OXYGEN CONCENTRATING EQUIPMENT

FIELD OF THE INVENTION

The object of this invention is an internal combustion engine with oxygen concentrating equipment that improves efficiency of the engine and reduces emission of pollutants. The field of application of the invention is all energy conversion areas where internal combustion engine is used. The object of the invention is also a method, a program product and a computer-readable medium for operating an internal combustion engine with oxygen concentrating equipment.

BACKGROUND OF THE INVENTION

Several solutions are known for reducing emission of pollutants in an internal combustion engine. One solution is using gas with higher than atmospheric oxygen to nitrogen ratio to burn fuel in an internal combustion engine.

If oxygen concentration of the gas for burning the fuel is higher than the oxygen concentration of the ambient air, it results better burning of the fuel and less hydrocarbon and nitrogen-oxide emission.

Internal combustion engines with oxygen concentrating equipment typically use either membrane or adsorption type oxygen concentrating equipment with inputs from the ambient air.

The aim of the invention is to provide a reliable, fuel efficient internal combustion engine with low pollutant emission.

DESCRIPTION OF RELATED ART

Several solutions are known for reducing emission of pollutants in an internal combustion engine. According to one of the solutions, oxygen concentration of the gas for burning the fuel is higher than the oxygen concentration of the ambient air, thus providing better burning of the fuel and less hydrocarbon and nitrogen-oxide emission. CN 1309237 A patent describes such a solution. The essence of the invention of that patent is that multi-cell, zeolite containing membrane or adsorption type oxygen concentrating equipment is used, which separates a part of the nitrogen component of the introduced gas and the oxygen rich gas product is introduced to the engine. The fuel is burned with this gas product in the combustion chamber of the engine.

Both oxygen separating systems from the referred patent application use external compressor. In case of failure of the compressor the engine will not be operable because it will not have the necessary oxygen containing gas to burn the fuel.

The U.S. 9149757 B2 patent describes a membrane type adsorption oxygen separating system. This system describes a similar system to the previously referred patent application, but this system has a bypass path for the case when the oxygen separating system is inoperable. Flaw of this system is that if the oxygen separating system is in operation, the output airflow of the compressor has to be adjusted dynamically to the gas mass requirement of the engine, which is cumbersome and may lead to premature failure of the compressor.

The U.S. 4240381 A patent shows a direct fuel injection engine, where optionally oxygen rich gas is injected to the combustion chamber before the power stroke in case the power demand is higher than in cruise condition. Deficiency of this system is that the oxygen rich compressed gas is produced in an equipment which is independent of the engine, thus decreasing reliability of the engine derived from failure of said equipment.

BRIEF SUMMARY OF THE INVENTION

The solution of the invention is an internal combustion engine with oxygen concentrating equipment where charging stroke is used for operating oxygen concentrating equipment instead of compression stroke that is customarily used at internal combustion engines. The essence of the invention is that the cylinder space and one or more cells of the oxygen concentrating equipment are made temporarily permeable during each charging stroke of the engine. The air taken in the cylinder space during the intake stroke and pushed out by the piston during the charging stroke charges one or more cells of the oxygen concentrating equipment and after separating most of the nitrogen in the cells, the oxygen rich gas through a compressor is injected to the cylinder space at the beginning of the power stroke by an injector. The fuel is also introduced in the cylinder space at the beginning of the power stroke by injector. The ignition may be spark ignition, self ignition (heat ignition) or their load dependent, speed dependent or power requirement dependent dynamic combination. Objects of the invention have been achieved by the method as defined in claim 1, the apparatus as defined in claim 13, the computer program product according to claim 19 and the computer-readable medium according to claim 20. Preferred embodiments of the invention are defined by sub-claims.

BRIEF DESCRIPTION OF THE SEVERAL VIEWS OF THE DRAWINGS

The invention of internal combustion engine with oxygen concentrating equipment will be described in more detail via drawings, wherein.

DETAILED DESCRIPTION OF THE INVENTION

Figure 1:
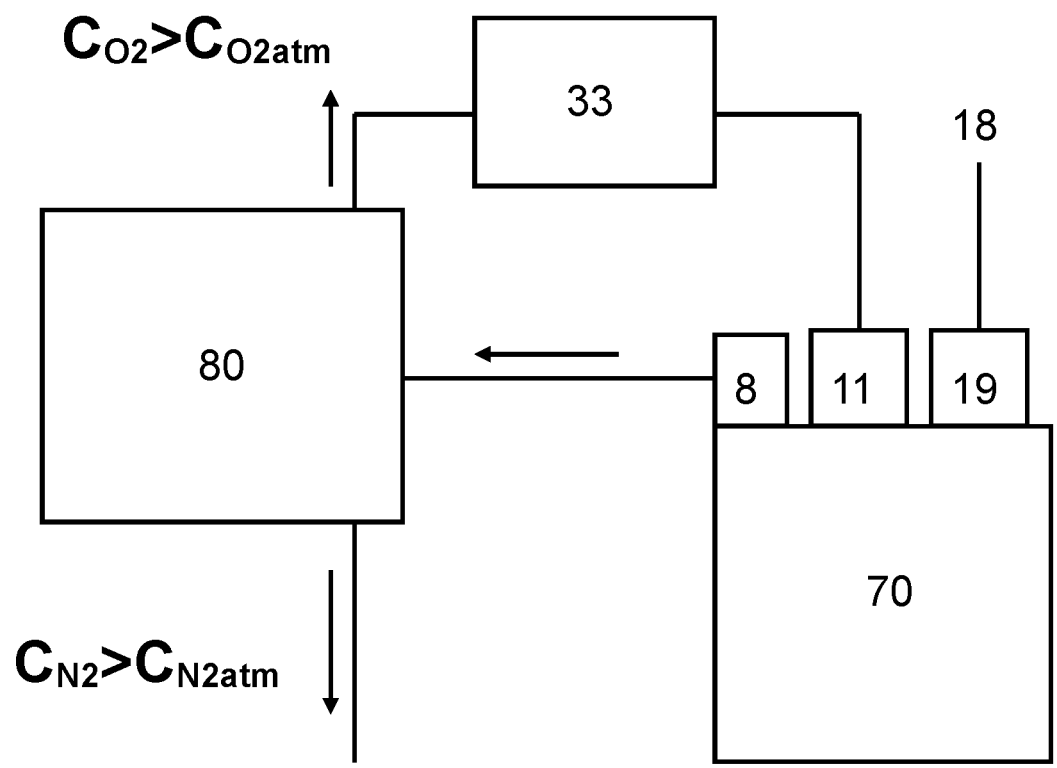
FIG. 1 is showing the connection of one cylinder of the internal combustion engine, the oxygen concentrating equipment and the compressor according to the invention.

FIG. 1 shows connection of one 70 cylinder of an internal combustion engine, the 80 oxygen concentrating equipment, and the 33 compressor according to the invention. The 8 charging manifold of the 70 cylinder is connected to the input of the 80 oxygen concentrating equipment, the output of the 80 oxygen concentrating equipment is connected to the input of the 33 compressor, the output of the 33 compressor is connected to the 11 injector. The fuel is delivered to the 70 cylinder through the 19 injector. The input of the 80 oxygen concentrating equipment is the charging gas pushed out from the cylinder space by the piston, the oxygen gas concentration at the output of the 80 oxygen concentrating equipment used for operating the engine is higher than the oxygen concentration of the air, and the nitrogen concentration of the gas emitted to the atmosphere is higher than the nitrogen concentration of the air.

FIGS. 2-7 show the 1 cylinder wall of one 70 cylinder of the internal combustion engine according to the invention, which is connected to the 2 crank case, to the 3 crack shaft built in the 2 crank case, to the 5 piston through the 4 piston rod on the 3 crank shaft. The 15 cylinder space is delimited from the bottom by the top surface of the 5 piston, from the side by the 1 cylinder wall, from the top by the 17 cylinder head. The 17 cylinder head comprises 7 intake, 14 exhaust and 9 charge valves operated synchronized with 3 crank shaft, the 11 oxygen rich gas injector, the 10 oxygen rich gas supply connected to the 11 oxygen rich gas injector, the 19 fuel injector and the 18 fuel supply connected to the 19 fuel injector, and the 12 spark plug in case of spark ignition.

Figure 8:
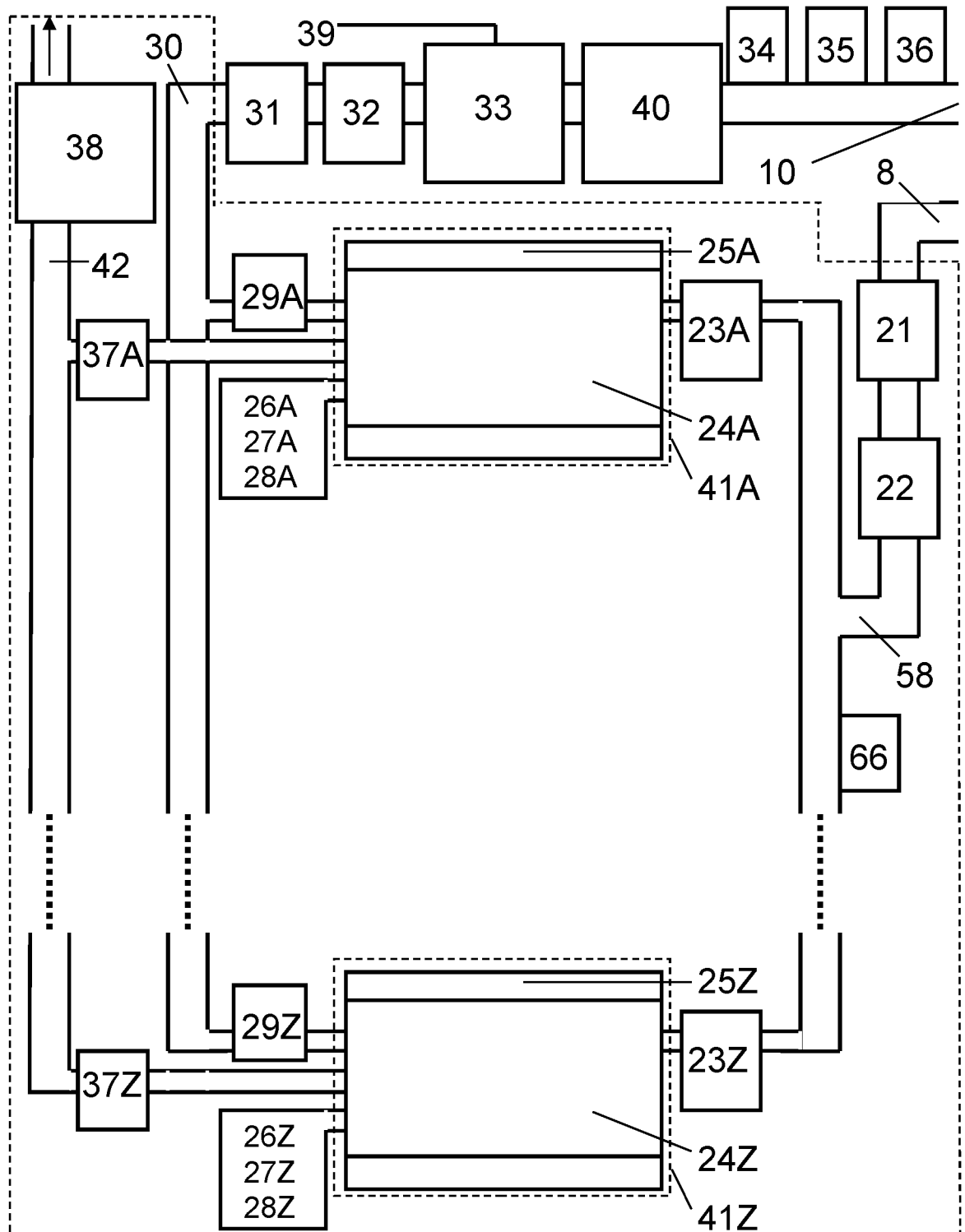
FIG. 8 is showing the multi-cell oxygen concentrating equipment with adsorption gas separation according to the invention.

FIG. 8 shows a multi-cell 81 oxygen concentrating equipment operated by adsorption gas separation according to the invention, where the material of 41A-41Z adsorption gas separating cells adsorbs the nitrogen component more than the oxygen of the higher than atmospheric pressure gas that is delivered to them. The material of the adsorption gas separating cells is typically zeolite. Charging of the 41A-41Z adsorption gas separating cells is done by the gas pushed out from the 15 cylinder space as a result of the movement of 5 piston of the internal combustion engine from the 8 charging manifold of the internal combustion engine through the 23 electromagnetic valve optionally inserting 21 filter and 22 intercooler, charging one or more adsorption gas separating cells per charge depending on a momentary power requirement and as a function of the quantity and oxygen concentration of the oxygen rich gas stored in the 40 reservoir. After a certain time has elapsed since the charge, the atmosphere of the adsorption gas separating cell contains oxygen rich gas, while the nitrogen is adsorbed to the material of the adsorption gas separating cell. Then the 29 electromagnetic valve for oxygen rich gas opens and the oxygen rich gas gets to the 33 compressor of the oxygen rich gas through the 30 first output of the adsorption type gas separating multi-cell 81 oxygen concentrating equipment and optionally through the 31 filter and optionally through the 32 intercooler, and the high pressure oxygen rich gas is stored in the 40 reservoir until usage. Adsorbing ability of the material of the adsorption type gas separating cell is reciprocal with the quantity of the adsorbed nitrogen. During regeneration of the saturated adsorption type separating cells the 37 electromagnetic valve opens and the 38 vacuum pump removes the nitrogen from the material of the adsorption type gas separating cell through the 42 second output of the adsorption type gas separating multi-cell 81 oxygen concentrating equipment by providing vacuum. Nitrogen will be released even after the end of the regeneration step, that is the closure of the 37 electromagnetic valve, while the pressure in the adsorption type gas separating cell is lower than the pressure before the oxygen rich gas was taken out from the cell. The adsorption type gas separating cell is ready for providing oxygen rich gas after the regeneration step. The 41A-41Z adsorption type gas separating cells may be optionally monitored by 26A-26Z oxygen sensors, 27A-27Z pressure sensors and 28A-28Z temperature sensors.

Figure 9:
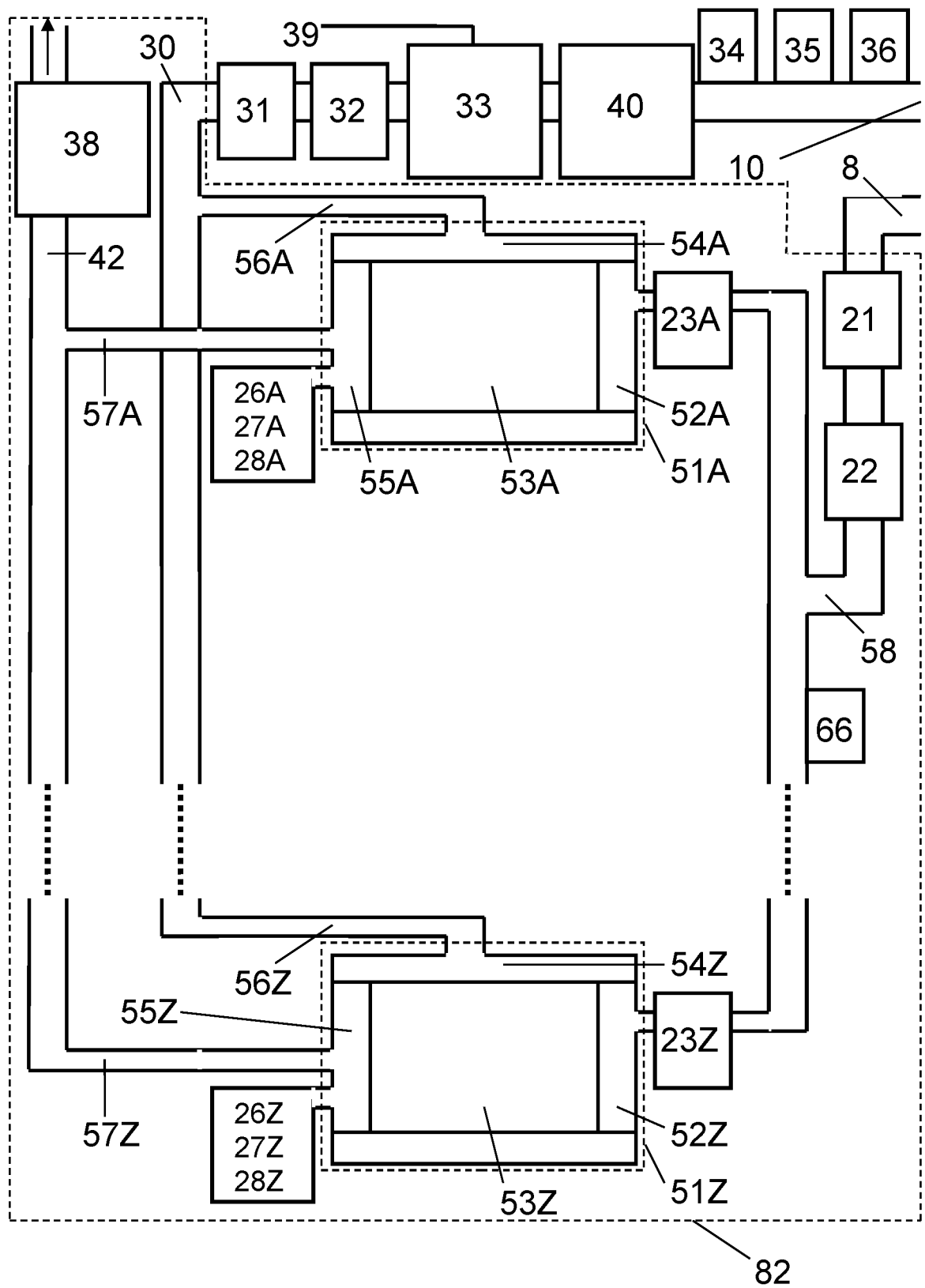
FIG. 9 is showing the multi-cell oxygen concentrating equipment with membrane gas separation according to the invention.

FIG. 9 shows one- or multi-cell 82 oxygen concentrating equipment operated by membrane type gas separation according to the invention, where the 51A-51Z membrane type gas separating cells permeate the oxygen component of the higher than atmospheric pressure gas delivered to them, while the delivered nitrogen component leaves at the end of the membranes. Material of the 51A-51Z membrane type gas separating cells is typically polysulfonate (PSO), polyimide (PI), poly(2,6-dimethyl-1,4-phenylene oxide) (PPO) or zeolite. Charging of the 51A-51Z adsorption gas separating cells is done by the gas pushed out from the 15 cylinder space as a result of the upward movement of 5 piston of the internal combustion engine to the top dead center from the 8 charging manifold of the internal combustion engine through the 23 electromagnetic valve optionally inserting 21 filter and 22 intercooler. The oxygen rich component permeated through the 51 membrane type gas separating cell gets on the 54 oxygen rich gas accumulating output of the 51 membrane type gas separating cell through the 56 tube to the 30 first output of the membrane type gas separating one- or multi-cell 82 oxygen concentrating equipment optionally through the 31 filter and optionally through the 32 intercooler, and the high pressure oxygen rich gas is stored in the 40 reservoir until usage. The 55A-55Z nitrogen rich outputs of the 51A-51Z membrane type gas separating cells is connected through the 57A-57Z tubes and through the 42 second output of the membrane type gas separating one- or multi-cell 82 oxygen concentrating equipment to the 38 vacuum pump. The 51A-51Z membrane type gas separating cells may be optionally monitored by 26A-26Z oxygen sensors, 27A-27Z pressure sensors and 28A-28Z temperature sensors.

Figure 2:
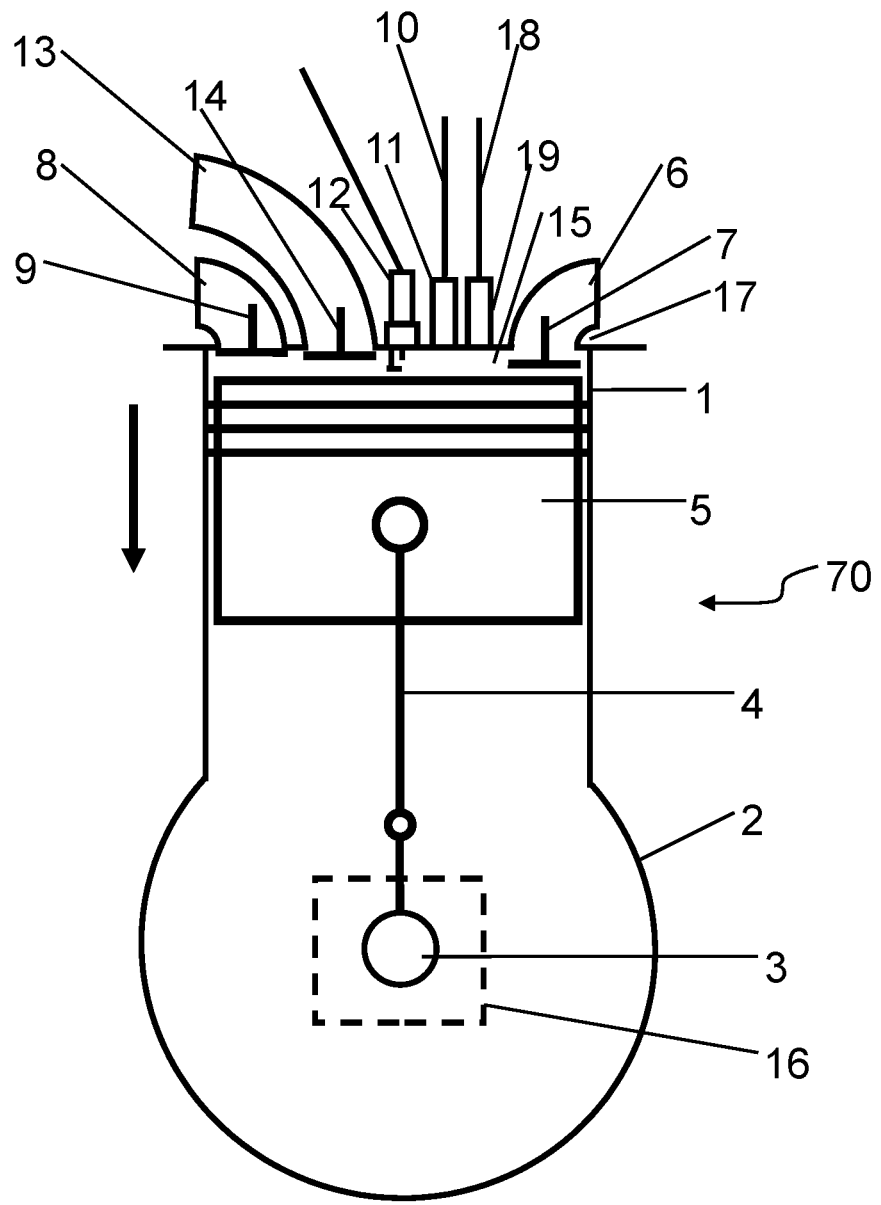
FIG. 2 is showing one cylinder of the internal combustion engine at the beginning of the intake stroke (at the end of the exhaust stroke) according to the invention.

FIG. 2 shows beginning of the intake stroke of the 70 cylinder where the 9 charging valve is closed, the 14 exhaust valve is partly open, the 7 intake valve is completely open thereby facilitating charging the 70 cylinder. As soon as the 5 piston starts from the top dead center towards the bottom dead center, the 14 exhaust valve closes, the 7 intake valve remains open until the bottom dead center is reached.

Figure 3:
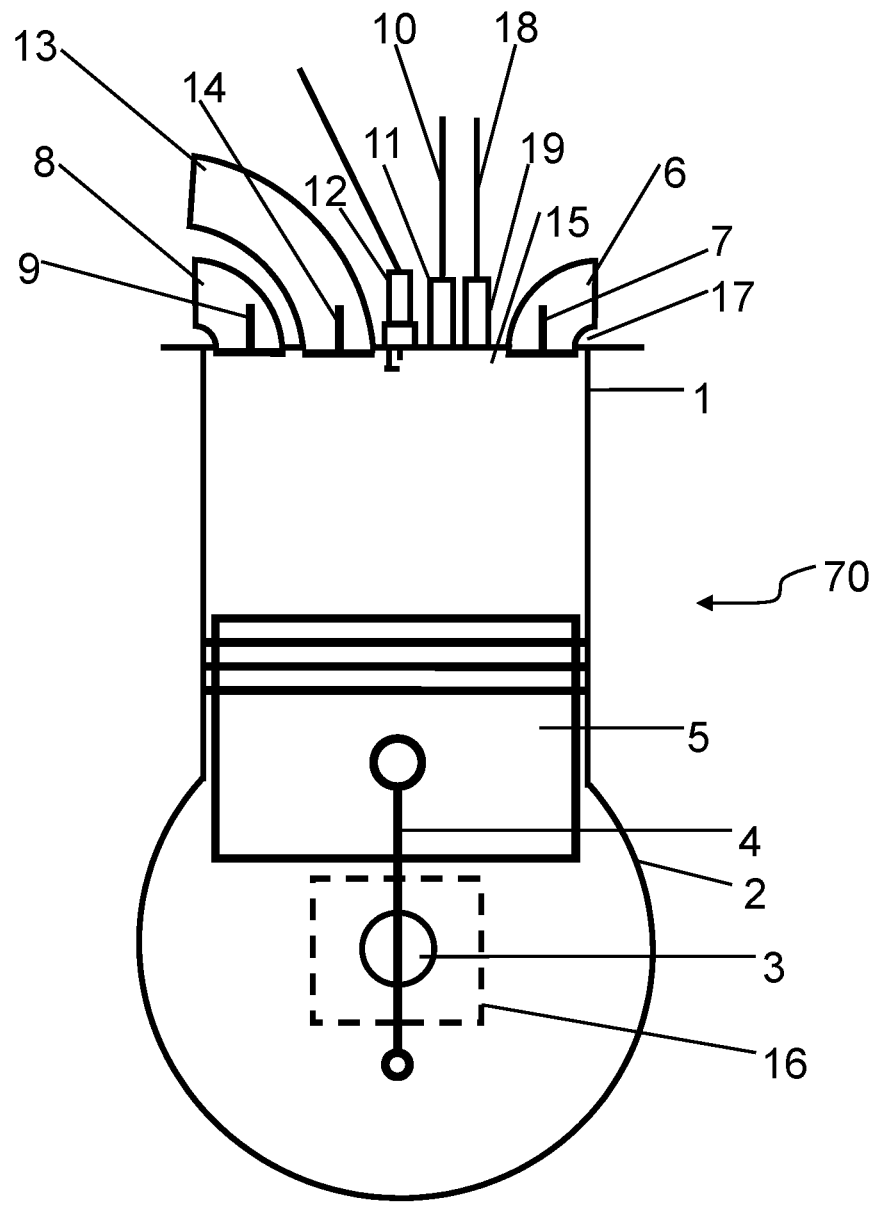
FIG. 3 is showing one cylinder of the internal combustion engine at the beginning of the charging stroke according to the invention.

FIG. 3 shows beginning of the charging stroke of the 70 cylinder, where the 14 exhaust valve and the 9 charging valve are closed, the 7 intake valve is completely open. As soon as the 5 piston starts from the bottom dead center towards the top dead center, the 7 intake valve closes.

Figure 4:
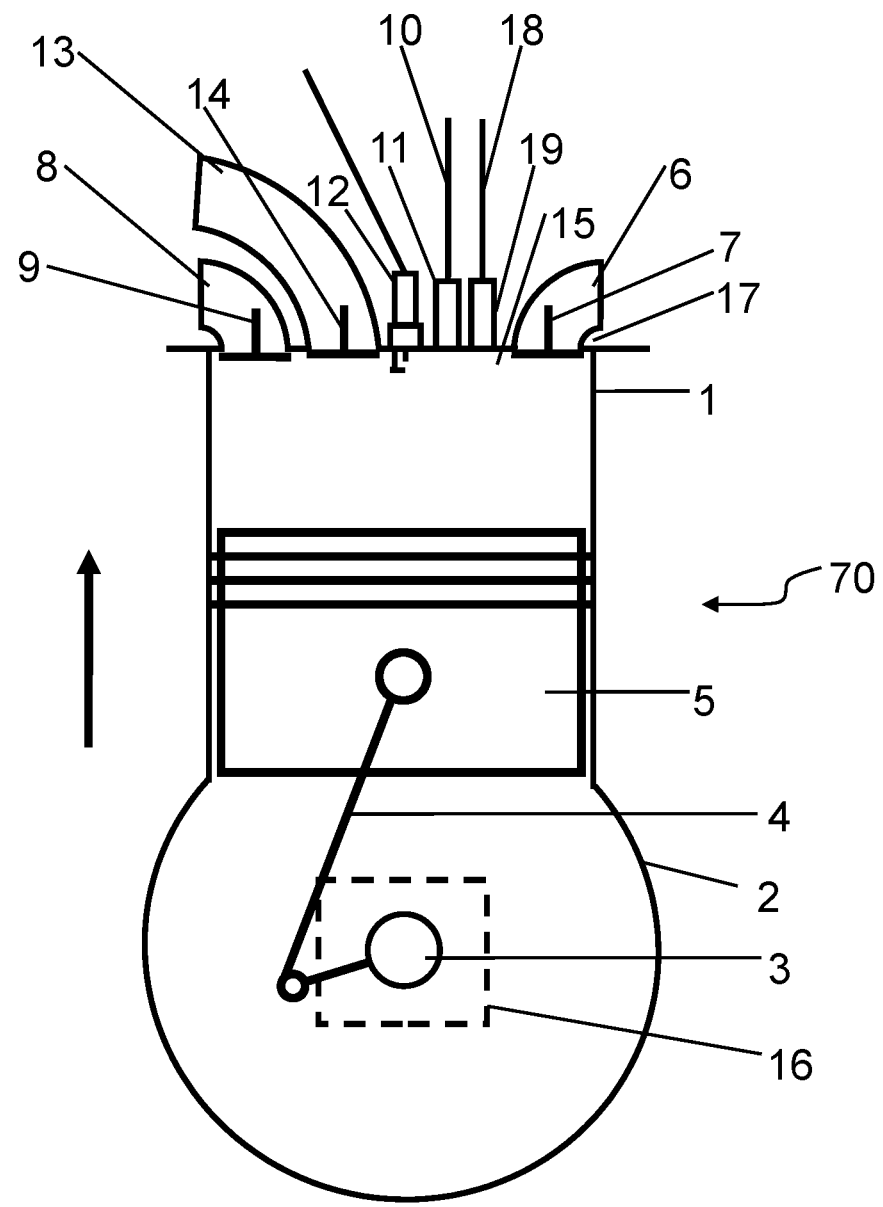
FIG. 4 is showing one cylinder of the internal combustion engine at the opening of the charging valve according to the invention.

FIG. 4 shows the 70 cylinder at opening of 9 charging valve when the 14 exhaust valve and the 7 intake valve are closed, the 5 piston moves towards the top dead center.

Opening of 9 charging valve is possible at a certain position of the 5 piston, or when pressure of the 15 cylinder space is higher than the pressure read by 66 pressure sensor on 58 input of 80 oxygen concentrating equipment.

Figure 5:
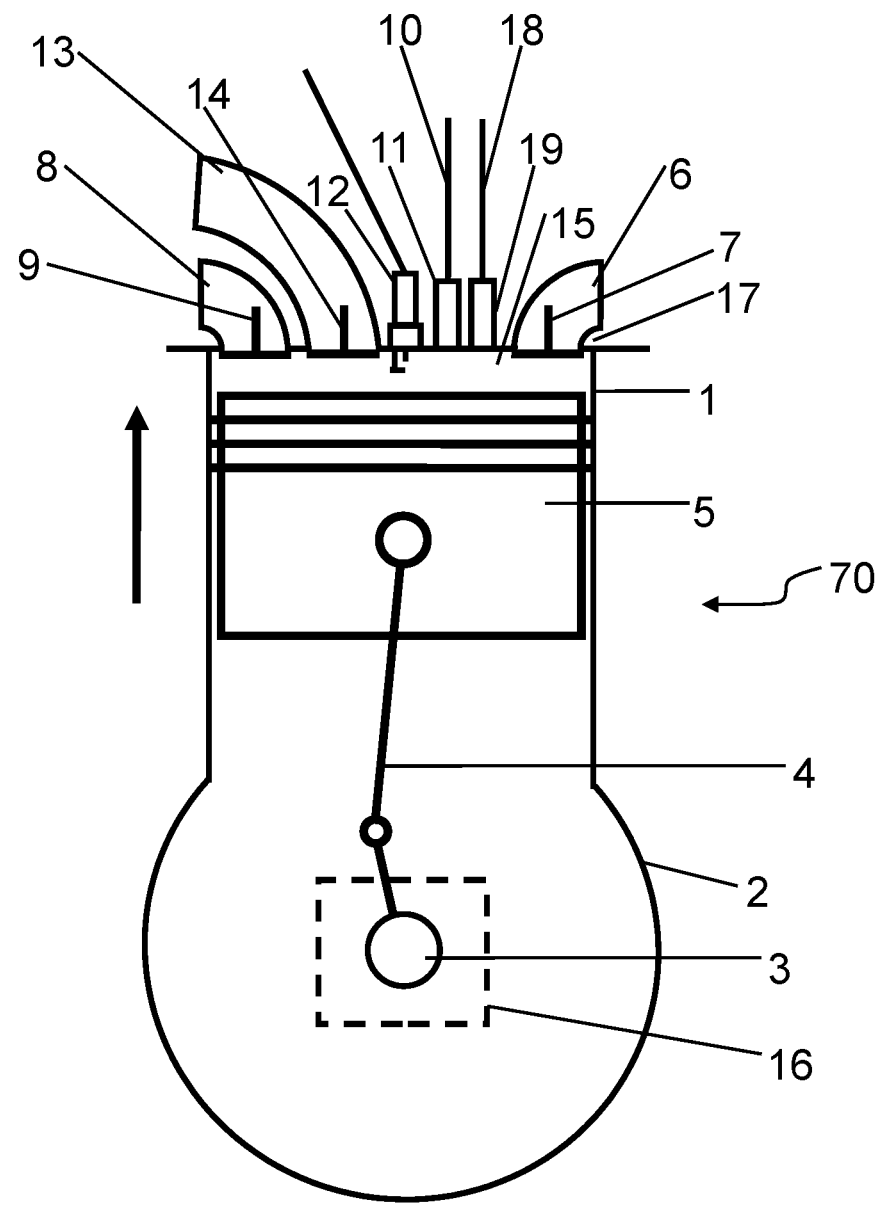
FIG. 5 is showing one cylinder of the internal combustion engine before the power stroke according to the invention.

FIG. 5 shows the 70 cylinder at closing of the 9 charging valve when the 14 exhaust valve and the 7 intake valve are closed, and the 9 charging valve closes. At this point the 5 piston is still before the top dead center.

Figure 6:
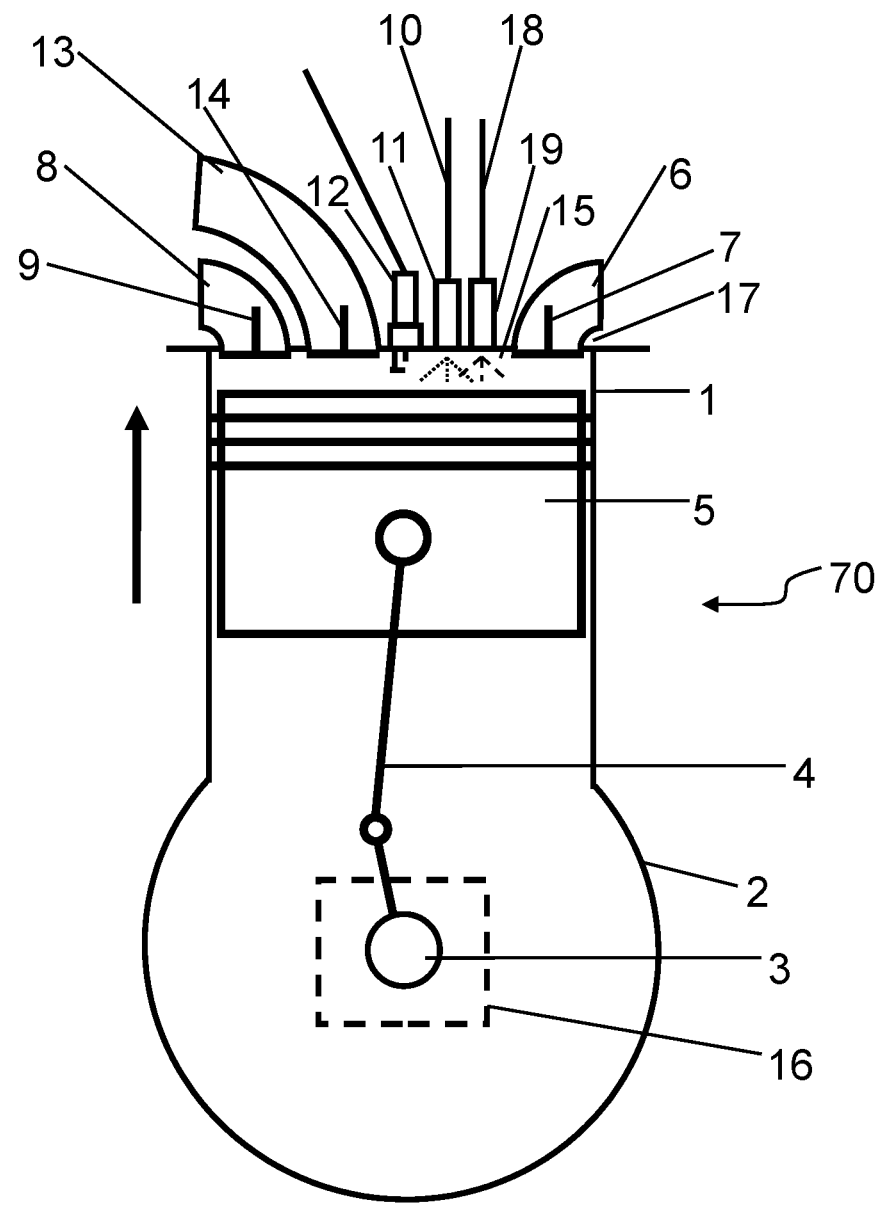
FIG. 6 is showing one cylinder of the internal combustion engine at the beginning of the power stroke according to the invention.

FIG. 6 shows 70 cylinder at the beginning of burning. At this point the 14 exhaust valve, the 7 intake valve and the 9 charging valve are closed, the 5 piston is still before the top dead center. The 11 injector from the 10 pressurized oxygen rich gas line injects oxygen rich compressed gas to the 15 cylinder space as a function of the required engine power. The 19 injector from the 18 pressurized fuel line injects fuel to the 15 cylinder space as a function of the required engine power. The mixture of fuel and oxygen rich compressed gas is ignited by the 12 spark plug in case of spark ignition. The mixture of fuel and oxygen rich compressed gas is ignited when the fuel is injected in case of self ignition. The 5 piston is moving from the top dead center towards the bottom dead center in the 70 cylinder transforming part of the energy generated from burning the fuel to mechanical energy.

Figure 7:
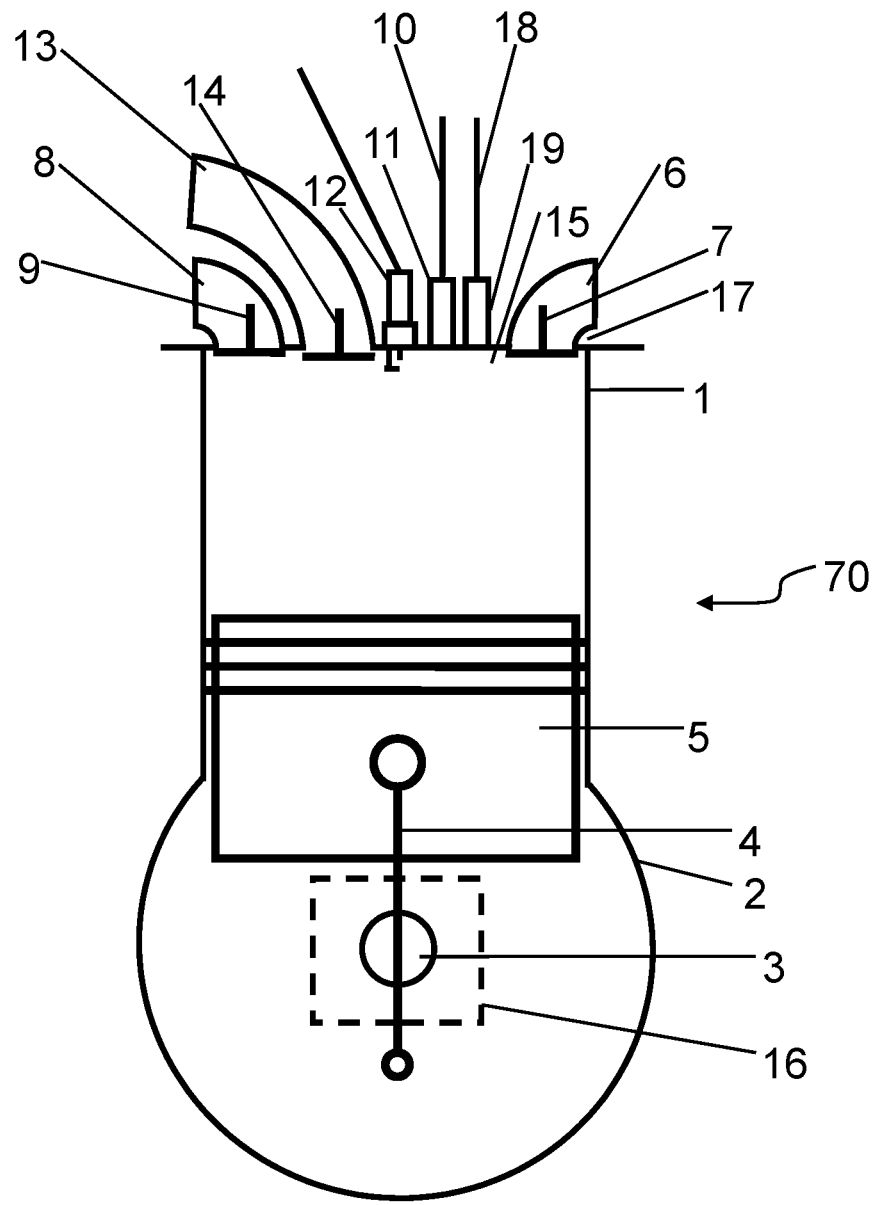
FIG. 7 is showing one cylinder of the internal combustion engine at the beginning of the exhaust stroke according to the invention.

FIG. 7 shows the 70 cylinder at the beginning of the exhaust stroke. At this point the 14 exhaust valve opens, the 7 intake valve and the 9 charging valve are closed. The 5 piston is moving from the bottom dead center towards the top dead center in the 70 cylinder, removing majority of the exhaust fumes through the 14 exhaust valve and the 13 exhaust manifold.

The end of the exhaust stroke of the 70 cylinder is identical to the beginning of the intake stroke of the 70 cylinder, which is shown on FIG. 2. Operation of the 70 cylinder is continuous by repeating steps described on FIGS. 2-7 as long as conditions to operate the engine are provided (rotational energy of crankshaft, fuel supply, oxygen supply, ignition in case of spark ignition, removal of heat and exhaust gas).

Figure 10:
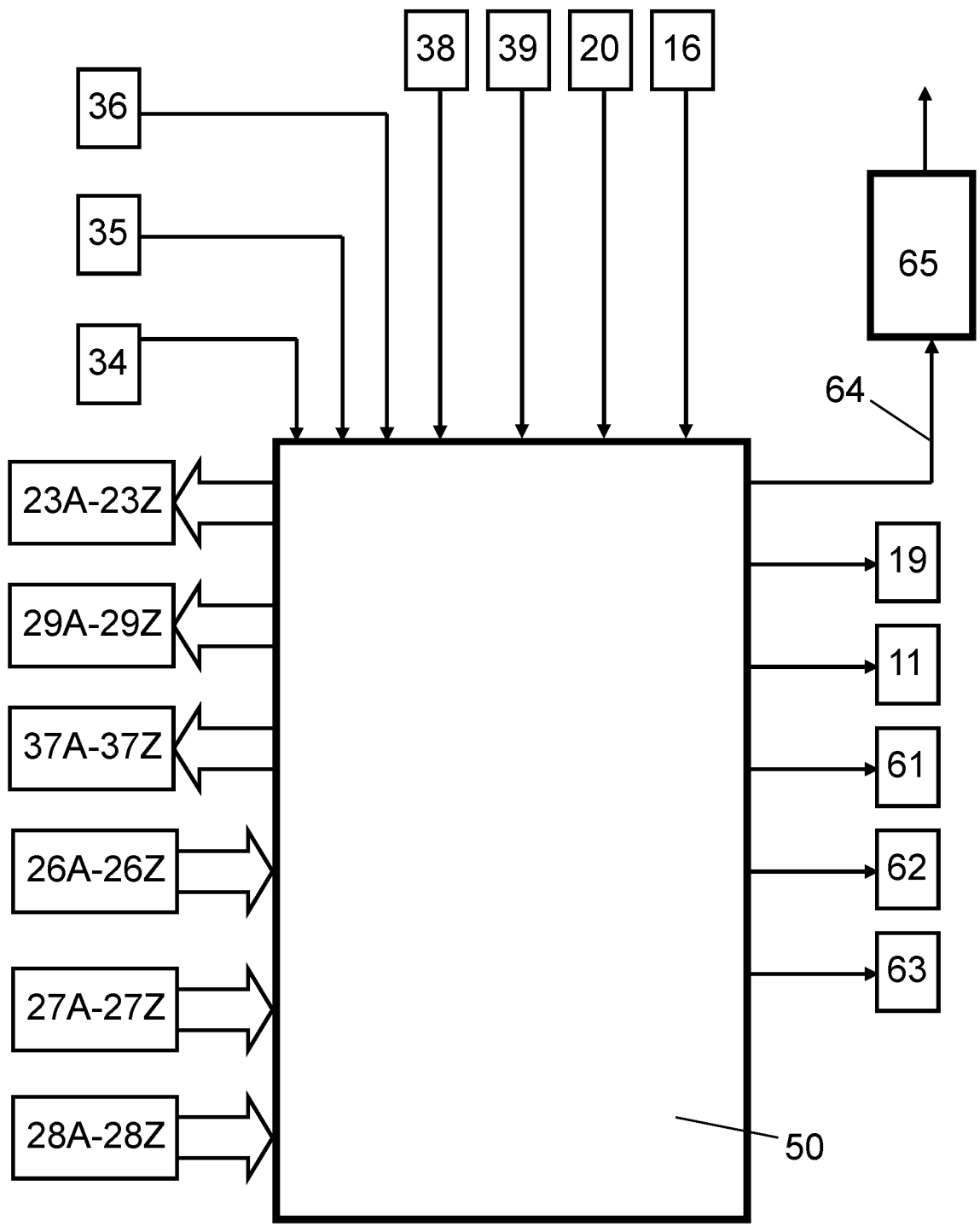
FIG. 10 is showing the control module of the internal combustion engine with oxygen concentrating equipment according to the invention.

FIG. 10 shows the 50 control module of the internal combustion engine with the 80 oxygen concentrating equipment according to the invention. The 50 control module has 16 crank shaft position sensor, 20 cam shaft position sensor, 34, oxygen sensor, 35 pressure sensor and 36 temperature sensor, 26A-26Z oxygen sensors, 27A-26Z pressure sensors and 28A-28Z temperature sensors, 66 pressure sensors, and optionally 61 load sensor, 62 tachometer sensor and 63 pedal position sensor inputs, the 23A-23Z input electromagnetic valve, 29A-29Z output electromagnetic valve, 37A-37Z electromagnetic valve, 38 vacuum pump, 39 compressor control, 11 oxygen rich gas injector, 10 oxygen rich gas supply connected to the 11 oxygen rich gas injector, the 19 fuel injector, and the 64 ignition control outputs. The 64 ignition control output is connected to the 65 ignition control module, the 65 ignition control module is connected to the 12 spark plug.

Operation of the internal combustion engine with the 50 control module is as follows:

The 50 control module detects the position of the 3 crank shaft and the cam shaft and the 5 piston pulls air to the 15 cylinder space that is enclosed by the 1 cylinder wall and the 17 cylinder head during the intake stroke. The 9 charging valve opens at a given position after the bottom dead center position during the charging stroke.

Figure 11:
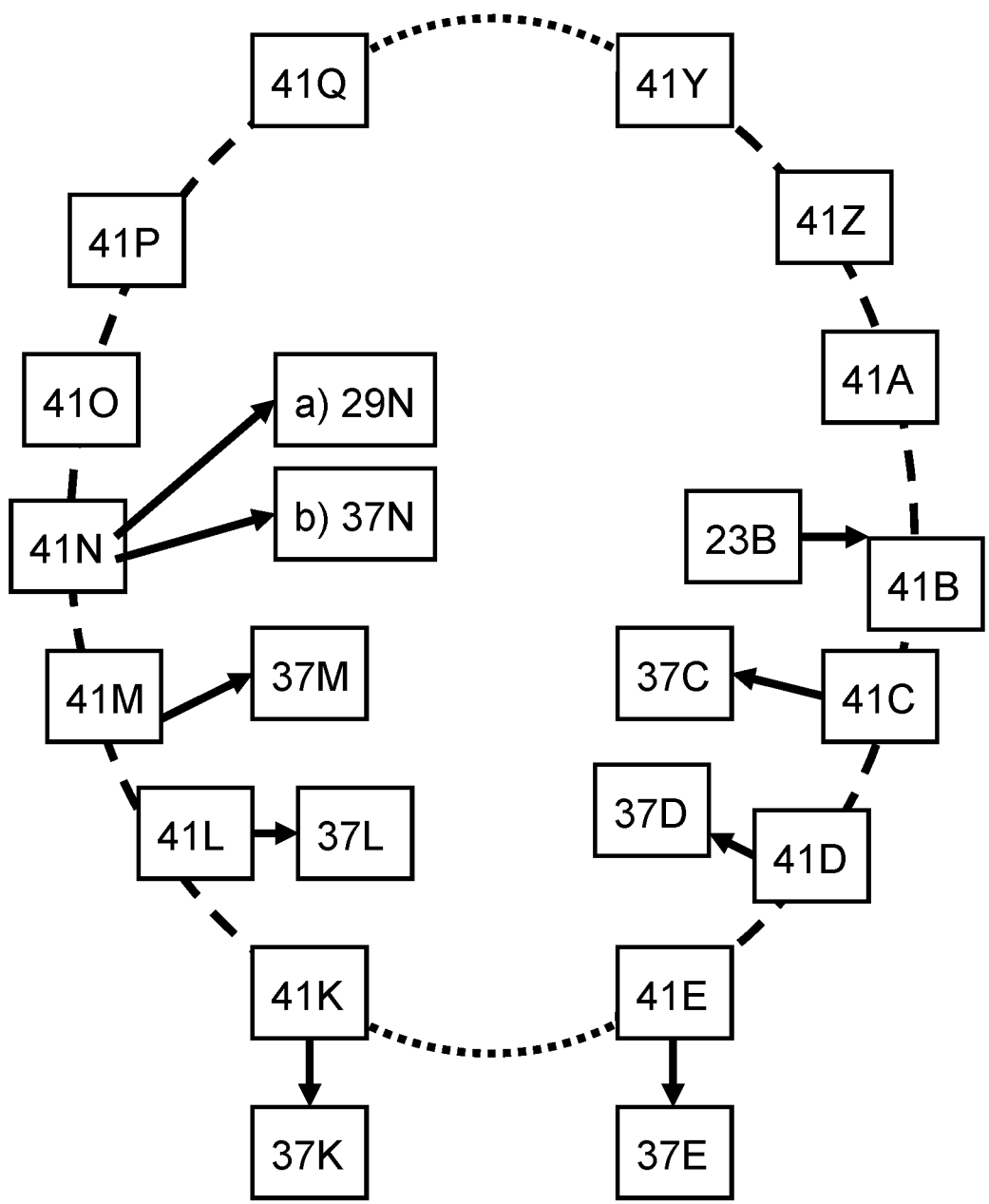
FIG. 11 is showing the cyclical operation of the multi-cell oxygen concentrating equipment with adsorption gas separation according to the invention.

In case of using the multi-cell 81 oxygen concentrating equipment operated by adsorption gas separation depicted on FIG. 8, this time the 23A-23Z electromagnetic valve belonging to the latest used and regenerated 41A-41Z adsorption gas separating cell opens and the 5 piston moving towards the top dead center charges the latest used and regenerated 41A-41Z adsorption gas separating cell with the air pulled in the 15 cylinder space and the residual gas remained in the cylinder at the beginning of the intake stroke. The next latest used and regenerated 41A-41Z adsorption gas separating cell is charged in the next charging stroke that follows this charging stroke. In the arrangement of the cells according to FIG. 11 in case of circular arrangement of the cells by placing the first 41A cell in sequence next to the last 41Z adsorption gas separating cell, the 50 control module will perform the following steps on the farthest positioned cell from both direction along the perimeter of the circle typically from the latest used and regenerated 41A-41Z adsorption gas separating cell—from the 41B adsorption gas separating cell on FIG. 11—on 41N adsorption gas separating cell: a) opens the 29 electromagnetic valve of 41N adsorption gas separating cell and the oxygen rich gas gets from the first 30 output of the multi-cell 81 oxygen concentrating equipment operated by adsorption gas separation to the 40 reservoir through, the optional 31 filter, the optional 32 intercooler and through the 33 compressor for the oxygen rich gas, and b) the 41N adsorption gas separating gets to the regeneration phase by opening 37N electromagnetic valve of 41N adsorption gas separating cell. The 50 control module typically opens the 37C-37M electromagnetic valves of cells that are found from the latest used and regenerated 41A-41Z cells towards the direction of the next latest used and regenerated cell from the farthest positioned 41A-41Z cell from both direction along the perimeter of the circle and keeps them in regeneration phase. The 41C adsorption gas separating cell will be charged at the next charging stroke and the produced oxygen rich gas is used and removed from the 41O adsorption gas separating cell by opening and closing the 29O electromagnetic valve and the 37O electromagnetic valve is kept open until repeated charging of the 41O adsorption gas separating cell and the a 41O adsorption gas separating cell is placed into regenerating phase. The distance between the latest used and earliest used adsorption gas separating cells may change depending on the momentary oxygen rich gas quantity needed for the engine, i.e. in case of higher demand of oxygen rich gas quantity the number cells in used and regeneration phase may increase, and in case of lower demand of oxygen rich gas quantity the number cells in charging phase may increase. In case of using adsorption type gas separation multi-cell 81 oxygen concentrating equipment, opening the 9 charging valve and one of the 23A-23Z electromagnetic valve belonging to one of the 41A-41Z cells that is ready for the next charge is advantageous right after the bottom dead center because the pressure in the 41A-41Z cell that is ready for the next charge is less than atmospheric pressure and this lower pressure helps the upward movement of the 5 piston. The process may be further optimized by that when the calculated momentary pressure based on the volume change of the air taken in the 15 cylinder space is equal or less than the pressure reading of the 66 pressure sensor.

In case of using one- or multi-cell 82 oxygen concentrating equipment operated by membrane type gas separation, the 23 electromagnetic valve belonging to the latest used 51 membrane type gas separating cell opens and the 5 piston moving towards the top dead center charges the latest used 51 membrane gas separating cell with the air pulled in the 15 cylinder space and the residual gas remained in the cylinder at the beginning of the intake stroke. The next latest used and regenerated 51 membrane type gas separating cell is charged in the next charging stroke that follows this charging stroke. Regeneration step is not necessary in case of using one- or multi-cell 82 oxygen concentrating equipment operated by membrane type gas separation; separation of oxygen from the gas pushed out by the 5 piston is continuous. The 55A-55Z nitrogen rich output of the 51A-51Z membrane type gas separating cells is connected through the 57A-57Z tubes and through the 42 second output of the membrane type gas separating one- or multi-cell 82 oxygen concentrating equipment to the 38 vacuum pump. The oxygen rich component permeated through the 51A-51Z membrane type gas separating cells get on the 54A-54Z oxygen rich gas accumulating outputs of the 51A-51Z membrane type gas separating cells without valve through the 56A-56Z tubes to the 30 first output of the membrane type gas separating one- or multi-cell 82 oxygen concentrating equipment optionally through the 31 filter and optionally through the 32 intercooler, and through the 33 compressor the high pressure oxygen rich gas gets to the 40 reservoir.

The 50 control module controls the adjustable parameters of the engine such as pre-ignition, quantity of oxygen rich gas and fuel, quantity, timing and length of their injections based on reading values of 26A-26Z oxygen sensors, 34, oxygen sensor, 27A-26Z pressure sensors, 35 pressure sensor, 28A-28Z temperature sensors, 36 temperature sensor, 61 load sensor, 62 tachometer sensor and 63 pedal position sensor inputs.

The 50 control module also makes decision whether the same one or more previously selected 41 adsorption cells or the next 41 adsorption cell is needed to be charged based on reading values of 26A-26Z oxygen sensors, 34, oxygen sensor, 27A-26Z pressure sensors, 35 pressure sensor, 28A-28Z temperature sensors, 36 temperature sensor, 61 load sensor, 62 tachometer sensor and 63 pedal position sensor inputs.

Additional advantage of the engine according to the invention is that the engine maybe further operated in emergency mode by closing the 9 charging valve in case of malfunction of the 33 compressor.

Advantage of the invention is that volume of 24A-24Z or 53A-53Z cavities are added to the 15 cylinder space during charging stroke, therefore the engine according to the invention reduces the energy loss caused during compression stroke more than the Atkinson engines because the engine according to the invention uses charging stroke instead of compression stroke in case of either using multi-cell 81 oxygen concentrating equipment operated by adsorption gas separation or using one- or multi-cell 82 oxygen concentrating equipment operated by membrane type gas separation. The lower than atmospheric pressure generated in the 41A-41Z adsorption gas separation cells or 51A-51Z membrane type gas separation cells by the 33 compressor and 38 vacuum pump during the charging stroke further helps upward movement of 5 piston.

Additional advantage of the invention is that pollutant emission, first of all the $N_xO_y$ emission is lower compared to the conventional engines.

Additional advantage is that the fuel consumption is lower because the fuel is burned more perfectly than at the engines burning the fuel by air.

Additional advantage is that wear of the engine is less than at the conventional engines because the piston, piston pin, piston rod, and the crank shaft are not exposed to high torque due to lack of compression by the piston.

The invention claimed is:

1. Method for operating internal combustion engine including a system bounded by at least one cylinder wall (1), piston (5) and cylinder head (17), comprising the steps of:
   (a) operating the system bounded by the cylinder wall (1), the piston (5) and the cylinder head (17) by intake, charging, power and exhaust strokes,
   (b) pushing out the gas by the piston (5) from the system bounded by the cylinder wall (1), the piston (5) and the cylinder head (17) during every charging stroke to operate an oxygen concentrating equipment (80),
   (c) injecting oxygen rich gas extracted by the oxygen concentrating equipment (80) to the system bounded by the cylinder wall (1), the piston (5) and the cylinder head (17) through a compressor (33) by an oxygen rich gas injector (11),
   (d) injecting fuel to the system bounded by the cylinder wall (1), the piston (5) and the cylinder head (17) by a fuel injector (19).

2. The method of claim 1 wherein the mixture of oxygen rich gas and fuel injected to the system bounded by the cylinder wall (1), the piston (5) and the cylinder head (17) is ignited by spark ignition.

3. The method of claim 1 wherein the mixture of oxygen rich gas and fuel injected to the system bounded by the cylinder wall (1), the piston (5) and the cylinder head (17) is ignited by self ignition.

4. The method of claim 1 wherein the mixture of oxygen rich gas and fuel injected to the system bounded by the cylinder wall (1), the piston (5) and the cylinder head (17) is ignited by load dependent, speed dependent and power dependent dynamic combination of spark ignition and self ignition.

5. The method of claim 1 wherein the oxygen concentrating equipment (80) is a two- or multi-cell adsorption type gas separation oxygen concentrating equipment (81).

6. The method of claim 2 wherein the oxygen concentrating equipment (80) is a two- or multi-cell adsorption type gas separation oxygen concentrating equipment (81).

7. The method of claim 3 wherein the oxygen concentrating equipment (80) is a two- or multi-cell adsorption type gas separation oxygen concentrating equipment (81).

8. The method of claim 4 wherein the oxygen concentrating equipment (80) is a two- or multi-cell adsorption type gas separation oxygen concentrating equipment (81).

9. The method of claim 1 wherein the oxygen concentrating equipment (80) is a one- or multi-cell membrane type gas separation oxygen concentrating equipment (82).

10. The method of claim 2 wherein the oxygen concentrating equipment (80) is a one- or multi-cell membrane type gas separation oxygen concentrating equipment (82).

11. The method of claim 3 wherein the oxygen concentrating equipment (80) is a one- or multi-cell membrane type gas separation oxygen concentrating equipment (82).

12. The method of claim 4 wherein the oxygen concentrating equipment (80) is a one- or multi-cell membrane type gas separation oxygen concentrating equipment (82).

13. Internal combustion engine including a system bounded by at least one cylinder wall (1), piston (5) and cylinder head (17), an intake valve (7) and an exhaust valve (14) connected to the system bounded by at least one cylinder wall (1), piston (5) and cylinder head (17), characterized by that:
   the system bounded by the cylinder wall (1), the piston (5) and the cylinder head (17) is operated by intake, charging, power and exhaust strokes, a charging valve (9) is connected to the system bounded by at least one cylinder wall (1), piston (5) and cylinder head (17), the output of the charging valve (9) is connected to the input (58) of an oxygen concentrating equipment (80) through a charging manifold (8), a first output (30) of the oxygen concentrating equipment (80) is connected to the input of a compressor (33), the output of the compressor (33) is connected to the input of an oxygen rich gas injector (11), the output of the oxygen rich gas injector (11) is in the system bounded by at least one cylinder wall (1), piston (5) and cylinder head (17), the output of a fuel injector (19) is in the system bounded by at least one cylinder wall (1), piston (5) and cylinder head (17), a second output (42) of the oxygen concentrating equipment (80) is connected to the input of a vacuum pump (38), the output of the vacuum pump (38) is in open atmosphere, the oxygen rich gas injector (11) and the fuel injector (19) are operated by a control module (50) the control module configured to execute:

(a) operating the system bounded by the cylinder wall (1), the piston (5) and the cylinder head (17) by intake, charging, power and exhaust strokes, (b) pushing out the gas by the piston (5) from the system bounded by the cylinder wall (1), the piston (5) and the cylinder head (17) during every charging stroke to operate the oxygen concentrating equipment (80), (c) injecting oxygen rich gas extracted by the oxygen concentrating equipment (80) to the system bounded by the cylinder wall (1), the piston (5) and the cylinder head (17) through a compressor (33) by the oxygen rich gas injector (11), (d) injecting fuel to the system bounded by the cylinder wall (1), the piston (5) and the cylinder head (17) by the fuel injector (19).

14. The internal combustion engine of claim 13 wherein the output of a spark plug (12) is connected to the system bounded by at least one cylinder wall (1), piston (5) and cylinder head (17), the input of the spark plug is connected to the output of a spark module (65), the spark module (65) is operated by the control module (50).

15. The internal combustion engine of claim 13 wherein the oxygen concentrating equipment (80) is a two- or multi-cell adsorption type gas separation oxygen concentrating equipment (81).

16. The internal combustion engine of claim 14 wherein the oxygen concentrating equipment (80) is a two- or multi-cell adsorption type gas separation oxygen concentrating equipment (81).

17. The internal combustion engine of claim 13 wherein the oxygen concentrating equipment (80) is a one- or multi-cell membrane type gas separation oxygen concentrating equipment (82).

18. The internal combustion engine of claim 14 wherein the oxygen concentrating equipment (80) is a one- or multi-cell membrane type gas separation oxygen concentrating equipment (82).

19. Computer program product, comprising:
instructions that execute steps of method described in claim 1 executed by computer.

20. Computer-readable medium, comprising:
instructions that execute steps of method described in claim 1 executed by computer.

* * * * *